United States Patent [19]
Hasegawa et al.

[11] Patent Number: 6,117,932
[45] Date of Patent: Sep. 12, 2000

[54] RESIN COMPOSITE

[75] Inventors: Naoki Hasegawa; Hirotaka Okamoto; Masaya Kawasumi; Arimitsu Usuki; Akane Okada, all of Aichi, Japan

[73] Assignee: Kabushiki Kaisha Toyota Chuo Kenkyusho, Aichi-gun, Japan

[21] Appl. No.: 09/154,723

[22] Filed: Sep. 17, 1998

[30] Foreign Application Priority Data

Sep. 18, 1997 [JP] Japan .................................. 9-273522
Sep. 24, 1997 [JP] Japan .................................. 9-278144
Oct. 3, 1997 [JP] Japan .................................. 9-287960

[51] Int. Cl.$^7$ ................................................. C08K 3/34
[52] U.S. Cl. ............................................... 524/445
[58] Field of Search ............................................. 524/445

[56] References Cited

U.S. PATENT DOCUMENTS

| | | | |
|---|---|---|---|
| 3,951,882 | 4/1976 | Markhart | 252/63.5 |
| 4,708,975 | 11/1987 | Shain | 523/216 |
| 4,753,974 | 6/1988 | Goodman | 524/447 |
| 5,218,011 | 6/1993 | Freeman | 523/173 |
| 5,319,014 | 6/1994 | Moorman | 524/427 |
| 5,717,000 | 2/1998 | Karande | 521/83 |

FOREIGN PATENT DOCUMENTS

| | | |
|---|---|---|
| 62-74957 | 4/1987 | Japan . |
| 1-198645 | 8/1989 | Japan . |
| WO 97/31053 | 8/1997 | WIPO . |

*Primary Examiner*—Paul R. Michl
*Attorney, Agent, or Firm*—Oblon, Spivak, McClelland, Maier & Neustadt, P.C.

[57] ABSTRACT

The resin composite of this invention comprises an organophilic clay and a polymer. The polymer is formed of two or more polymers at least one of which has a functional group, or the polymer is formed of a copolymer having a functional group. This structure provides the resin composite which can be easily made composite with a wide range of applications, and imparts the optimum physical properties to the composite.

25 Claims, 8 Drawing Sheets

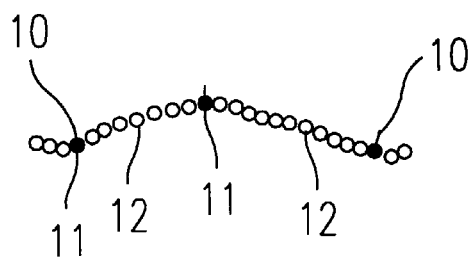
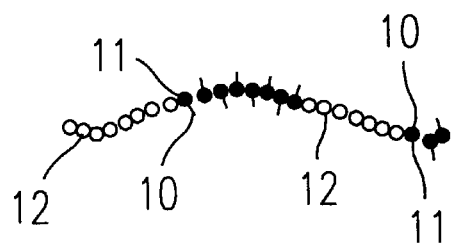
FIG. 4A  FIG. 4B
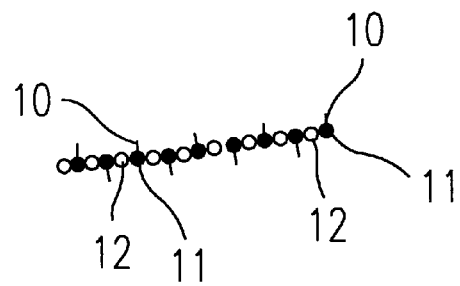
FIG. 4C

FIG·7

RESIN COMPOSITE

BACKGROUND OF THE INVENTION

1. Filed of the Invention

The present invention relates to a resin composite for improving physical properties such as modulus of elasticity.

2. Description of the Related Arts

Attempts have been made to add and mix a clay to an organic polymer material for the purpose of improvement in its mechanical properties. For example, methods for dispersing clay in nylons, vinylic polymers, a thermosetting polymer such as epoxy resins or in rubbers have been disclosed (Japanese Laid-Open Patent Publication No.62-74957 and No. 1-198645, E. P. Giannelis et. al., Chem. Mater. 5, 1694–1696(1993), etc.). In these arts, the following methods are used to disperse the clay: rendering the clay compatible with an organic material by using an organic onium ion to start polymerization of a monomer between layers of the clay; combining the clay with a growth seed; and inserting a polymerized material between interlayer sections of clay by kneading them together.

However, a clay composite obtained by any of the conventional methods described above suffered from poor affinity of the clay with a non-polar polymer. Accordingly, the non-polar polymer was not readily intercalated between the layers of the clay for the purpose of expanding the layer. Therefore, it was difficult to disperse the clay uniformly throughout the non-polar polymer.

Moreover, even when the polymers such as polystyrene are intercalated between the layers of clay, only a single layer can be intercalated, thus, interlaminar swelling is limited.

In order to overcome such problems, we previously proposed, as shown in FIG. 9, to derivatize a clay 7 by means of an organic onium ion 6 into an organophilic clay 3, which is then dispersed in guest molecules 91 having polar groups 910 (Japanese Laid-Open Patent Publication No.8-333114).

SUMMARY OF THE INVENTION

The present invention provides a resin composite which can be easily made composite and has a wide range of applications, and the physical properties of which can be suitably controlled.

The present invention is a resin composite comprising an organophilic clay and polymers, wherein (a) the polymer is formed of two or more polymers wherein at least one of them has a functional group, or (b) the polymer is formed of a copolymer having a functional group.

In the present invention, the polymer comprises a functional group having a high affinity for an organophilic clay. Since the functional group interacts with the organophilic clay, the organophilic clay is dispersed at a molecular level in the polymer having the functional group. Thus, the physical properties of the resin composite can be improved.

The first aspect of the present invention is that the polymer comprises two or more polymers in which at least one of them has a functional group.

Preferably, the polymer is formed of two or more of polymers and at least one of them comprises a functional group.

This functional group interacts with the hydrophilic organophilic clay so that the organophilic clay is dispersed at a molecular level in the polymer having a functional group.

The key feature of the present invention is that the state of dispersion of the organophilic clay varies depending on whether the two or more polymers are compatible or incompatible with each other.

If the two or more polymers are compatible with each other, a polymer A100 and a polymer B101 form a compatibilized matrix 81 as shown in FIGS. 1A and 1B. In the compatibilized matrix 81, at least one polymer has a functional group. Because of this structure, the functional group interacts with a hydrophilic organophilic clay 3 so that the organophilic clay 3 is dispersed at a molecular level uniformly in the compatibilized matrix 81.

On the other hand, if the two or more polymers are incompatible with each other, molecules of polymer A gather while molecules of polymer B gather, respectively, such that one polymer A103 forms a matrix 821 and another polymer B104 forms a micelle 822 in the matrix 821 as shown in FIG. 2A. In this way, incompatibilized matrix 82, which comprises two or more incompatible polymers, is formed. The state thus formed can be likened to a sea and island structure comprising sea (matrix) and islands (micelles) floating therein.

At least one polymer selected from the polymers, i.e., a polymer serving as the matrix and a polymer serving as the micelle in the incompatibilized matrix, has a functional group which has a high affinity for the organophilic clay. This functional group interacts with the organophilic clay so that the organophilic clay is dispersed at a molecular level in the polymer having the functional group.

Namely, if the polymer A103, which forms the matrix 821 in the incompatibilized matrix 82, has a functional group as shown in FIG. 2B, the organophilic clay 3 is dispersed in the matrix 821.

If the polymer A103, which forms the matrix 821, and the polymer B104, which forms the micelle 822, each have a functional group as shown in FIG. 2C, the organophilic clay is dispersed in the matrix 821 as well as in the micelle 822.

If the polymer B104, which forms the micelle 822 in the incompatibilized matrix 82, has a functional group as shown in FIG. 2D, the organophilic clay 3 is dispersed in the micelle 822.

As described above, the state (or morphology) of dispersion of the organophilic clay varies depending on whether the two or more polymers are compatible or incompatible with each other, and, in the latter case, further depending on whether the polymer serving as the matrix has a functional group or the polymer serving as the micelle has a functional group. Accordingly, such a difference in the state of dispersion significantly affects the physical properties of the resin composite.

The second aspect of the present invention is that the polymer formed of a copolymer has a functional group.

Preferably, the polymer is formed of a copolymer having a functional group. As used herein, the term "copolymer having a functional group" means a copolymer made up of a monomer having a functional group and a monomer copolymerizable with the monomer having a functional group.

According to this, the resin composite of the present invention has excellent mechanical properties such as excellent modulus of elasticity and mechanical strength in particular. Further, it has excellent gas-barrier properties. These excellent properties are believed to be brought about by the following mechanism.

As shown in FIG. 3, a copolymer 1 has a functional group 10. Because of this structure, the functional group 10 and a highly-polar organophilic clay 3 cause an interaction which allows the copolymer 1 to be intercalated between the layers of the organophilic clay 3 having a multilayered structure so that the organophilic clay 3 is dispersed in the copolymer 1 at a molecular level. As a result, the molecular motion of the copolymer is inhibited by the organophilic clay, thereby producing a resin composite having excellent mechanical properties.

In addition, since the organophilic clay is finely dispersed in the matrix comprising the copolymer, the resin composite has excellent gas-barrier properties.

According to this invention, it is possible to provide a resin composite which can be easily made composite and has a wide range of applications, and the physical properties of which can be suitably controlled.

BRIEF DESCRIPTION OF THE DRAWINGS

FIGS. 4A to 4C are explanatory views of a copolymer.

Figure 1:
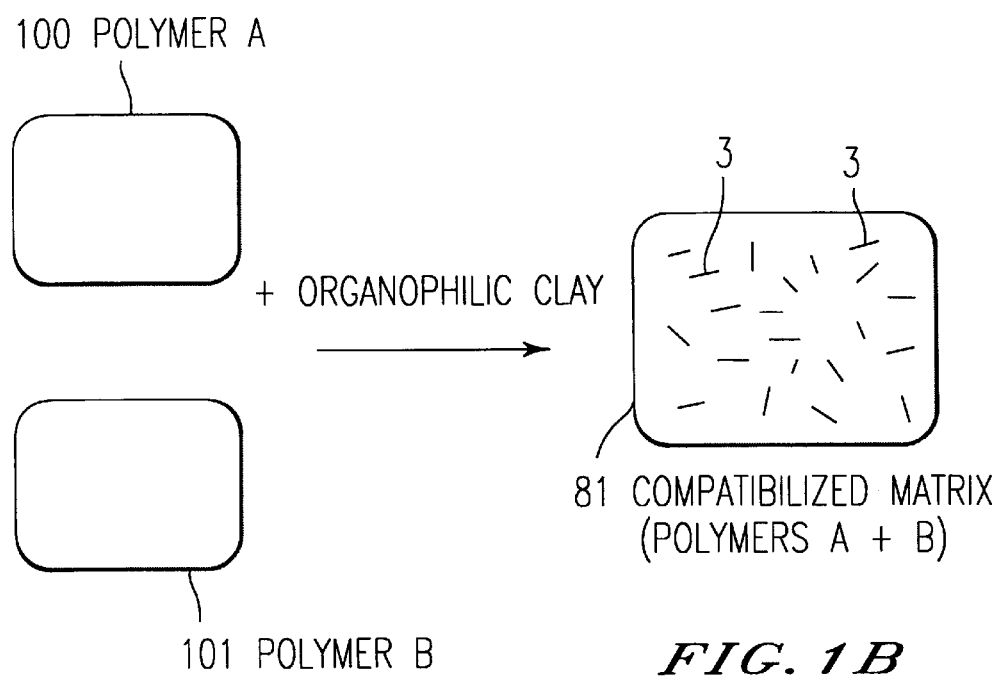
FIG. 1A is an explanatory view of compatible polymers A and B according to this invention.
FIG. 1B is an explanatory view of a dispersing condition of an organophilic clay in a compatible matrix according to this invention.

DETAILED DESCRIPTION OF THE INVENTION (a) Case Where the Polymer is Formed of Two or More Wherein One of Them Comprises a Functional Group (Polymer)

Examples of the polymer having a functional group include a copolymer having a functional group and a modified polymer having a functional group introduced thereinto by way of modification.

First, a copolymer having a functional group is described below.

As shown in FIGS. 4A to 4C, a copolymer having a functional group means a copolymer made up of a functional monomer 11 which has a functional group 10 and a monomer 12 copolymerizable with the functional monomer 11.

The type of the copolymer, in terms of the distribution of the functional monomers in the copolymer, is not particularly limited. As shown in FIGS. 4A to 4C, the copolymer may be a random copolymer (FIG. 4A) in which the functional monomers 11 are randomly distributed in the copolymer, or the copolymer may be an alternating copolymer (FIG. 4C) in which functional monomers and a copolymerizable monomer are alternately linked to each other. Otherwise, sequences of a plurality of the functional monomers 11 may be distributed in the copolymer, as shown in FIG. 4B. Generally, as the amount of the functional monomers increases in the copolymer, the copolymer necessarily approaches a block copolymer. Further, the copolymer may be branched by use of a monomer having two or more polymerizable groups.

The functional group which is introduced is not particularly limited in so far as it can be intercalated between the layers of clay. Whether or not a functional group is intercalated between the layers of clay can be judged by a procedure comprising the steps of blending a functional monomer having the functional group with an organophilic clay and thereafter measuring the interlayer distance of the organophilic clay by X-ray diffractometry. If the intercalation has occurred, the interlayer distance of the organophilic clay widens.

Some preferable examples of the functional groups which can be intercalated include functional groups such as acid anhydride groups, carboxyl groups, hydroxyl groups, thiol groups, epoxy groups, halide groups, ester groups, amide groups, urea groups, urethane groups, ether groups, thioether groups, sulfonic acid groups, phosphonic acid groups, nitro groups, amino groups, oxazoline groups, imide groups and isocyanate groups, and aromatic rings such as benzene rings, pyridine rings, pyrrole rings, furan rings, and thiophene rings.

The functional monomer is not particularly limited in so far as it is a polymerizable monomer having the functional group above. One or more functional groups are present in the monomer. If two or more functional groups are present, the functional groups may be the same or different. Examples of the monomer having such a functional group include acrylic monomers such as methyl (meth)acrylate, ethyl(meth)acrylate, and propyl (meth)acrylate; acrylamides such as (meth)acrylamide, methyl(meth)acrylamide, and ethyl(meth)acrylamide; compounds having an unsaturated carbon atom such as (meth)acrylic acid, maleic anhydride, and maleimide; and monomers having aromatic rings such as benzene rings, pyridine rings, and thiophene rings, e.g., styrene, vinylpyridine, and vinylthiophene.

The functional monomer may be a monomer having two or more polymerizable groups (e.g., vinyl group) in a molecule.

Examples of the monomer copolymerizable with the functional monomer include hydrocarbon compounds having a double bond such as ethylene, propylene, butene, and pentene; hydrocarbon compounds having a triple bond such as acetylene and propyne; and hydrocarbon compounds having two or more conjugated unsaturated bonds such as butadiene and isoprene. A branched structure or a ring structure may be present in the hydrocarbon chain of these compounds.

Depending on the combination with the functional monomer, the monomers enumerated above may be acrylic monomers such as methyl (meth)acrylate, ethyl(meth)acrylate, and propyl (meth)acrylate; acrylamides such as (meth)acrylamide, methyl(meth)acrylamide, and ethyl (meth)acrylamide; and monomers having aromatic rings such as styrene and methylstyrene. The aromatic ring may have a substituent group as in the case of methylstyrene.

Further, the monomer may have two or more polymerizable groups in a molecule.

Whether the monomer is a functional group monomer or a monomer which is copolymerizable with a functional monomer is relatively determined. Namely, the functional group monomer means a monomer whose interaction with clay layers is larger than that of the other monomer. For example, in the case of ethylene-styrene copolymer, styrene having larger interaction with the clay layers becomes a functional group monomer. In the case of styrene-vinyloxazoline copolymer, vinyloxazoline having larger interaction becomes a functional group monomer. Accordingly, a functional group monomer part constituted of a functional group monomer in a copolymer has a larger interaction with clay layers, compared with other parts of the copolymer.

Next, the modified polymer is described below.

Figure 5A:
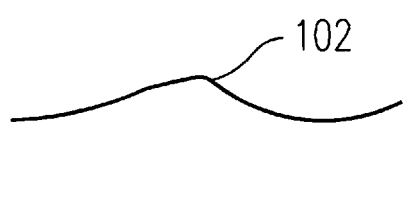
FIG. 5A is an explanatory view of a polymer before modification according to this invention.
Figure 5B:
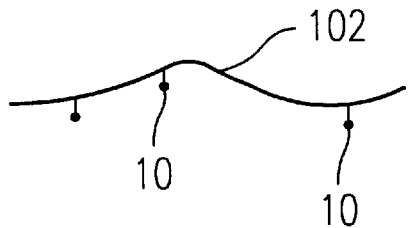
FIG. 5B is an explanatory view of a modified polymer according to this invention.

The modified polymer means a polymer obtained by the modification of a polymer 102 of FIG. 5A so that a functional group 10 is introduced into the side chain or the main chain as shown in FIG. 5B. Examples of the polymer include polyethylene, polypropylene, polybutene, polypentene, ethylene-propylene copolymers, ethylene-butene copolymers, polybutadiene, polyisoprene, hydrogenated polybutadiene, hydrogenated polyisoprene, ethylene-propylene-diene copolymers, ethylene-butene-diene copolymers, butyl rubber, polystyrene, styrene-butadiene copolymers, styrene-hydrogenated butadiene copolymers, polyamide, polycarbonate, polyacetal, polyester, poly(phenylene ether), poly(phenylene sulfide), polyethersulfone, polyetherketone, polyarylate, polymethylpentene, polyphthalamide, polyethernitrile, polybenzimidazole, polycarbodiimide, polytetrafluoroethylene, fluororesins, polyamideimide, polyetherimide, liquid crystal polymers, epoxy resins, melamine resins, urea resins, diallyl phthalate resins, phenolic resins, polysilanes, polysiloxanes, silicone resins, and urethane resins.

The functional group which is introduced by the modification is not particularly limited in so far as it can be intercalated between the layers of clay. Whether or not a functional group is intercalated between the layers of clay can be judged by a procedure comprising the steps of blending a compound having the functional group with an organophilic clay and thereafter measuring the interlayer distance of the organophilic clay by X-ray diffractometry. If the intercalation has occurred, the interlayer distance of the organophilic clay widens. Some preferable examples of the functional groups are given hereinafter, but not limited to: functional groups such as acid anhydride groups, carboxyl groups, hydroxyl groups, thiol groups, epoxy groups, halide groups, ester groups, amide groups, urea groups, urethane groups, ether groups, thioether groups, sulfonic acid groups, phosphonic acid groups, nitro groups, amino groups, oxazoline groups, and isocyanate groups and aromatic rings such as benzene rings, pyridine rings, pyrrole rings, furan rings, and thiophene rings. Because of the presence of such a functional group, the dispersibility of the organophilic clay in the modified polymer is further improved.

In the case of a polymer having a functional group such as polystyrene, the functional group to be introduced for modification is preferably one which has a larger interaction with the layers of clay.

Next, the use of a combination of two or more polymers is explained below with respect to the case where the polymers are compatible with each other and the case where the polymers are incompatible with each other.

(Case where the polymers are compatible with each other)

The two or more polymers are not particularly limited in so far as the polymers are compatible with each other. For example, the following combinations are possible.

Firstly, the structure of the main chain of a polymer having a functional group is preferably identical or similar to that of the other polymer to be combined. If this condition is met, the two or more polymers are more compatible with each other. A specific combination comprises any of the aforedescribed modified polymers and a polymer before the modification thereto. However, caution must be exercised because a modified polymer and a polymer before the modification thereto may not be compatible with each other if the degree of modification is excessive. Since the degree of modification of the modified polymer varies depending on the kinds of the polymer, it cannot be specified.

Some illustrative examples of the combination of an unmodified polymer and a modified polymer are given hereinafter, but not limited to: a combination of polyethylene (hereinafter referred to as PE) and modified PE, a combination of polypropylene (hereinafter referred to as PP) and modified PP, and a combination of an ethylene propylene rubber (hereinafter referred to as EPR) and modified EPR.

Secondly, the structure of a polymer having a functional group and that of the other polymer to be combined are partially identical to each other. For example, a combination comprises a copolymer having the functional group and a polymer compatible with the copolymer. Some illustrative examples of the combination are given hereinafter, but not limited to: a combination of an ethylene-acrylic acid copolymer and PE, and a combination of ethylene-methyl acrylate copolymer and PE. However, caution must be exercised because an incompatibility problem occurs if the amount of a different monomer, such as acrylic acid or methyl acrylate, is excessive. Since the amount of the different monomer varies depending on the kinds of the polymer, it cannot be specified.

Thirdly, even if the structure of the main chain of a polymer having a functional group is different from that of the other polymer to be combined, no problem occurs in so far as these polymers are compatible with each other. Examples of these combinations include a combination of poly(phenylene oxide) (hereinafter referred to as PPO) and polystyrene, a combination of polystyrene and poly(vinyl methyl ether), a combination of poly(vinyl chloride) and polycaprolacton, a combination of PMMA [poly(methyl methacrylate)] and poly(vinylidene fluoride), and a combination of polycarbonate and an MMA (methyl methacrylate) copolymer.

(Case where the polymers are incompatible with each other)

The two or more polymers are not particularly limited in so far as the polymers are incompatible with each other. For example, the following combinations are possible.

Examples of the combination of a polymer having a functional group and other polymer include a combination comprising the aforementioned copolymer having a functional group or the aforementioned modified polymer and a polymer incompatible with the foregoing polymer.

Some illustrative examples of the polymer incompatible with the copolymer or the modified polymer are given hereinafter, but not limited to: polyethylene, polypropylene, polybutene, polypentene, ethylene-propylene copolymers, ethylene-butene copolymers, polybutadiene, polyisoprene, hydrogenated polybutadiene, hydrogenated polyisoprene, ethylene-propylene-diene copolymers, ethylene-butene-diene copolymers, butyl rubber, polystyrene, styrene-butadiene copolymers, styrene-hydrogenated butadiene copolymers, polyamide, polycarbonate, polyacetal, polyester, poly(phenylene ether), poly(phenylene sulfide), polyethersulfone, polyetherketone, polyarylate, polymethylpentene, polyphthalamide, polyethernitrile, polybenzimidazole, polycarbodiimide, polytetrafluoroethylene, fluororesins, polyamideimide, polyetherimide, liquid crystal polymers, epoxy resins, melamine resins, urea resins, diallyl phthalate resins, phenolic resins, polysilanes, polysiloxanes, silicone resins, and urethane resins.

In the case of that a polymer forming a matrix in an incompatibilized matrix comprises a functional group (FIG. 2B), examples of the combination of the polymers include a combination of modified polypropylene and ethylene propylene rubber, however it cannot be limited only to this combination.

In the case of that both of the polymer forming a matrix in an incompatibilized matrix and the polymer forming a micelle respectively comprise functional groups (FIG. 2C), examples of the combination of the polymers include a combination of modified polypropylene and modified ethylene propylene rubber, however, it cannot be limited only to this combination.

In the case of that a polymer forming a micelle in an incompatibilized matrix comprises a functional group (FIG. 2D), examples of the combination of the polymers include a combination of homopolypropylene and modified ethylene propylene rubber and a combination of butyl rubber and modified ethylene propylene rubber, however, it cannot be limited only to these combinations.

The functional group may be present in any of the two or more polymers in the case where the polymers are compatible with each other and also in the case where the polymers are incompatible with each other.

The number average molecular weight is preferably 5,000 to 10,000,000 in the case where the polymers are compatible with each other and also in the case where the polymers are incompatible with each other. If the molecular weight is less than 5,000, the mechanical properties of the resin composite may be poor. To the contrary, if the molecular weight is more than 10,000,000, a processability problem of the resin composite may arise.

The number average molecular weight of the polymer is more preferably 10,000 to 1,000,000. If the molecular weight is within this range, the mechanical properties and the processability of the resin composite can be further improved.

(Organophilic Clay)

Figure 6:
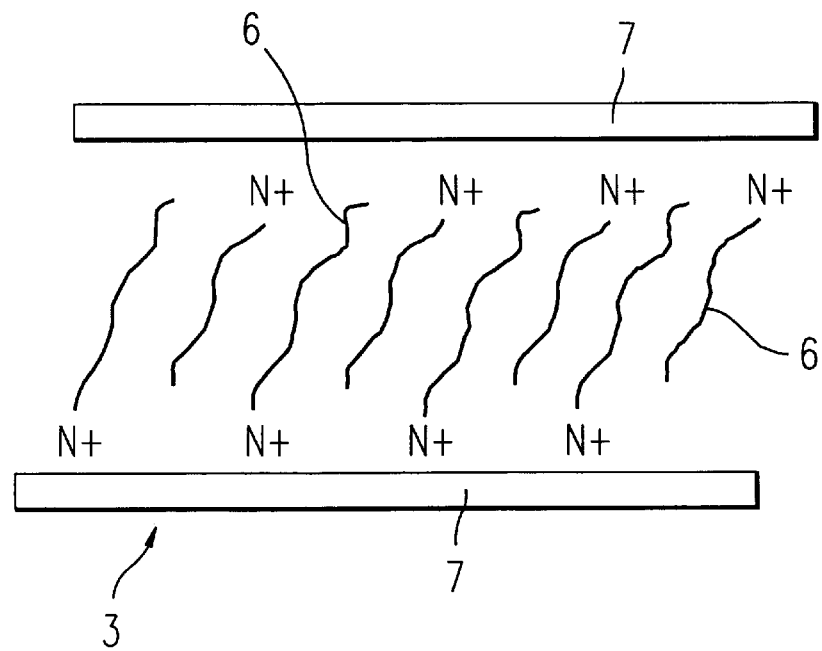
FIG. 6 is an explanatory view of an organophilic clay according to this invention.

As shown in FIG. 6, the term iorganophilic clay 3" as used herein means a clay modified with an organic substance by ionic bonding between organic onium ions 6 and the surface of clay 7.

It is preferable that the clay be modified with an organic substance by an ionic bond with an organic onium ion having 6 or more carbon atoms. This is because, if the carbon number is less than 6, the hydrophilicity of the organic onium ion is so high that the compatibility of the organic onium ion with the polymer may decrease.

Examples of the organic onium ions include hexylammonium ions, octylammonium ions, 2-ethylhexylammonium ions, dodecylammonium ions, laurylammonium ions, octadecylammonium ions (stearylammonium ions), dioctyldimethylammonium ions, trioctylammonium ions, distearyldimethylammonium ions, stearyltrimethylammonium ions, and ammonium laurate ions.

It is preferable to use a clay having a larger area for contact with the polymer. If the contact area is larger, the magnitude of the swell between the layers of the clay can be made larger. The cation exchanging capacity of the clay is preferably 50 to 200 milliequivalents/100 g. If the capacity is less than 50 milliequivalents/100 g, the exchange of the onium ions is insufficient and the swelling between the layers of the clay may be difficult. To the contrary, if the capacity is more than 200 milliequivalents/100 g, the bond strength between the layers of the clay is so strong that the swelling between the layers of the clay may be difficult.

Examples of the clay include smectite clay, such as montmorillonite, saponite, hectorite, beidellite, stibensite, and nontronite, as well as vermiculite, halloysite, and mica. These substances may be naturally occurring ones or synthetic ones.

The content to be used of the organic onium ion is preferably 0.3 to 3 equivalents of the ion exchanging capacity of the clay. If the amount is less than 0.3 equivalents, the swelling between the layers of the clay may be difficult, whereas, if the amount is more than 3 equivalents, the degradation of the polymer may occur, thereby causing the discoloration of the resin composite.

More preferably, the content to be used of the organic onium ion is 0.5 to 2 equivalents of the ion exchanging capacity of the clay. If the amount is within this range, the swelling between the layers of the clay can be further increased, and the degradation and the discoloration of the resin composite can be further prevented.

The amount of the organophilic clay to be added is preferably 0.01 to 200 parts by weight based on 100 parts by weight of the total amount of the two or more polymer. Within this range, the mechanical properties of the resin composite is increased. If the amount is less than 0.01 parts by weight, the improvement in mechanical properties by the addition of the organophilic clay may not be recognized. To the contrary, if the amount is more than 200 parts by weight, the viscosity of the resin composite becomes so high that the formability may become poor.

More preferably, the amount of the organophilic clay to be added is 0.1 to 100 parts by weight. Within this range, the mechanical properties and the formability of the resulting resin composite are well balanced. Particularly preferable amount is 0.1 to 30 parts by weight.

(Interlayer Distance of Organophilic Clay)

In the polymer having a functional group, the organophilic clay is dispersed preferably in particles having sizes of 1 $\mu$m or less. This state of dispersion improves the mechanical properties of the resin composite.

Further, it is preferable that the polymer is intercalated between the layers of the clay. The intercalation increases the interface between the clay surface and the polymer and thus increases the reinforcing effect of the organophilic clay to be exerted on the polymer. The term "intercalation" means a state where the interlayer distance of the organophilic clay after making the organophilic clay and the modified polymer composite is larger than the interlayer distance of the organophilic clay before making the organophilic clay and the polymer composite. This state can be observed by, for example, X-ray diffractometry.

More preferably, the interlayer distance of the organophilic clay after making the organophilic clay and the polymer composite is enlarged by 10 Å or more, compared to the interlayer distance before making them composite. Most preferably, the interlayer distance of the organophilic clay is enlarged by 30 Å or more. Particularly preferably, the interlayer distance of the organophilic clay is enlarged by 100 Å or more. This enlargement increases the proportion of the polymer which is restricted by the organophilic clay and thus increases the reinforcing effect of the organophilic clay.

More preferably, the multilayered structure of the organophilic clay disappears and the organophilic clay is dispersed as a single-layer substance. This state of dispersion further increases the proportion of the polymer which is restricted by the organophilic clay and thus increases the reinforcing effect of the organophilic clay.

Even in the above-mentioned case, however, some of the organophilic clay may have a multilayered structure comprising several layers in so far as the physical properties of the resin composite are not adversely affected.

(Use of Resin composite)

The resin composite of the present invention can be used in the fabrication of, for example, injection-molded articles, extrusion-molded articles, blow-molded articles, press-molded articles and films.

(Method for Producing Resin composite)

An example of the method for producing the resin composite is a method which comprises mixing of two or more polymers and an organophilic clay. The organophilic clay and the polymers can be mixed simultaneously, or otherwise, they can be mixed in an arbitrary order.

This mixing, for example, can be performed in a solvent such as an organic solvent and oil, followed by removal of the solvent. This leads to improved dispersing properties of the organophilic clay.

Further, the above mixing is performed by heating the copolymer and the organophilic clay to a temperature which is equal to or higher their softening points or melting points. More preferably, a shearing force is applied to the copolymer and the organophilic clay during the mixing thereof. This leads to a uniform dispersion of the organophilic clay in the polymers. It is especially preferable that the polymers and the organophilic clay are melt-kneaded under application of a shearing force by means of an extruder.

By performing this producing method, the organophilic clay is finely dispersed in the polymer comprising a functional group. Further, according to the method of the present invention, it is possible to obtain a resin composite having excellent mechanical properties such as excellent mechanical strength and modulus of elasticity in particular.

The above-mentioned advantages are believed to be brought about by the following mechanism. When mixed with an organophilic clay having a multilayered structure, the polymer having a functional group enters between the layers of the organophilic clay. Since the functional group of the polymer has a high affinity for the surface of the clay, the polymer remains stabilized between the layers of the organophilic clay. By this mechanism, an intercalation compound can be obtained in which the polymer is intercalated between the layers of the organophilic clay. In addition, the shearing force which is applied at the time of melt-kneading disperses the organophilic clay at a molecular level.

The method for producing the resin composite of the present invention comprises modifying a polymer by introducing a functional group therein, kneading the modified polymer and an organophilic clay to obtain the composite thereof.

The above mentioned "modifying" means to bond a functional group to a side chain and/or a main chain of a polymer. A modified polymer, therefore, means a polymer having a functional group bonded to a side chain and/or a main chain thereof.

By performing this producing method, the organophilic clay is finely dispersed in the matrix comprising the modified polymer. Further, according to the method of the present invention, it is possible to obtain a resin composite having excellent mechanical properties such as excellent mechanical strength and modulus of elasticity in particular.

The above-mentioned advantages are believed to be brought about by the following mechanism. When mixed with an organophilic clay having multilayered structure, the modified polymer having a functional group enters between the layers of the organophilic clay. Since the functional group of the modified polymer has a high affinity for the surface of the clay, the modified polymer remains stabilized between the layers of the organophilic clay. By this mechanism, an intercalation compound can be obtained in which the modified polymer is intercalated between the layers of the organophilic clay. In addition, the shearing force which is applied at the time of melt-kneading disperses the organophilic clay at a molecular level.

More specifically, the organophilic clay and the modified polymer are blended, and the blend is heated to a temperature which is equal to or higher than the softening point or the melting point of the modified polymer. Preferably, a shearing force is applied at the time of blending, because the shearing force applied makes it possible to finely disperse the organophilicclay into the modified polymer. Most preferably, melt-kneading is performed by using an extruder while a shearing force is being applied. At the time of melt-kneading, an organic solvent, an oil, or the like may be added in order to improve the dispersibility of the organophilic clay.

It is also possible to modify a polymer in the forepart of an extruder and to produce in a subsequent part of the extruder a composite by adding the organophilic clay to the modified polymer. In this case, it is preferable that the highest possible proportion of the modifying agent should be linked to the polymer and the free modifying agent should not remain.

Further, it is also possible to charge an extruder with a polymer, a reagent and an organophilic clay to modify the polymer so as to carry out the modification and making them composite simultaneously. Furthermore, it is also possible to blend a polymer and an organophilic clay in the forepart of an extruder and to add in a subsequent part of the extruder a reagent for the modification.

As stated above, the producing method of the present invention can be easily performed and can provide a composite which has a wide range of applications.

The functional group which is introduced by the modification is not particularly limited in so far as it can be intercalated between the layers of clay. Whether or not a functional group is intercalated between the layers of clay can be judged by measuring with X-ray diffractometry the interlayer distance of the organophilic clay blended with a compound having the functional group. If the intercalation has occurred, the interlayer distance of the organophilic clay widens.

Some preferable examples of the functional groups are given hereinafter, but not limited to: functional groups such as acid anhydride groups, carboxyl groups, hydroxyl groups, thiol groups, epoxy groups, halide groups, ester groups, amide groups, urea groups, urethane groups, ether groups, thioether groups, sulfonic acid groups, phosphonic acid groups, nitro groups, amino groups, oxazoline groups and isocyanate groups; and aromatic rings such as benzene rings, pyridine rings, pyrrole rings, furan rings, and thiophene rings. By these groups, the dispersibility of the organophilic clay in the modified polymer further increases.

In the case of a polymer having a functional group such as polystyrene, the functional group to be introduced for modification is preferably one which has a larger interaction with the layers of clay.

The amount of the functional group to be introduced into the polymer is preferably 0.001 to 1 mmol/g (i.e., 0.01 to 10% by weight calculated in maleic anhydride equivalent). If the amount is within this range, the organophilic clay can be finely dispersed while the physical properties of the polymer are maintained. If the amount is less than 0.001 mmol/g, the organophilic clay may not be finely dispersed because the polymer cannot be intercalated between the layers of the clay. To the contrary, if the amount is more than 1 mmol/g, the physical properties of the polymer may not be maintained because of the occurrence of, for example, severance or cross-linking of a polymer chain at the time when the polymer is modified.

For the same reason as described above, the amount of the functional group to be introduced into the polymer is more preferably 0.005 to 0.5 mmol/g (i.e., 0.05 to 5% by weight calculated in maleic anhydride equivalent).

The method for modifying the polymer is not particularly limited and a known method can be used. For example, a polymer is dissolved in a solvent and then a functional group is introduced into the polymer by the reaction between the polymer and a reagent (modifying agent) in the solution. In this reaction, a radical initiator such as a peroxide may be used.

Alternatively, in a blending machine, an extruder, or the like, the polymer is melted and a compound having a functional group is added to the melt so that the functional group is introduced into the polymer. In this blending, if a radical initiator such as a peroxide is present, the functional group is efficiently introduced. In this case, it is desirable that the amount of the modifying agent which has not been linked to the polymer be smaller.

As stated above, the producing method of the present invention can be easily performed and can provide a composite which has a wide range of applications.

(Case where the polymer is copolymer comprising a functional group)

As shown in FIGS. 4A to 4C, a copolymer 1 which has a functional group 10 is a copolymer made up of a functional monomer 11 having a functional group 10 and a monomer 12 copolymerizable with the functional monomer 11.

The distribution of the functional monomers in the copolymer, is not particularly limited. As shown in FIGS. 4A to 4C, the copolymer may be an alternating copolymer (FIG. 4C) in which a functional monomer and a copolymerizable monomer are alternately linked to each other, or may be a random copolymer (FIG. 4A) in which functional monomers 11 are randomly distributed in the copolymer 1. Otherwise, sequences of a plurality of the functional monomers 11 may be distributed in the copolymer, as in FIG. 4B. Generally, as the amount of the functional monomers increases in the copolymer, the copolymer necessarily approaches a block copolymer.

Further, the copolymer may be branched by the presence of a monomer having two or more polymerizable groups.

The functional group which is introduced is not particularly limited in so far as it can be intercalated between the layers of clay. Whether or not a functional group is intercalated between the layers of clay can be judged by measuring with X-ray diffractometry the interlayer distance of the organophilic clay blended with a functional monomer. If the intercalation has occurred, the interlayer distance of the organophilic clay widens.

Some preferable examples of the functional groups which can be intercalated are given hereinafter, but not limited to: functional groups such as acid anhydride groups, carboxyl groups, hydroxyl groups, thiol groups, epoxy groups, halide groups, ester groups, amide groups, urea groups, urethane groups, ether groups, thioether groups, sulfonic acid groups, phosphonic acid groups, nitro groups, amino groups, oxazoline groups, imide groups and isocyanate groups; and aromatic rings such as benzene rings, pyridine rings, pyrrole rings, furan rings, and thiophene rings.

The functional monomer is not particularly limited in so far as it is a polymerizable monomer having the functional group. One or more functional groups are present in the monomer. If two or more functional groups are present, the functional groups may be the same or different. Examples of the monomer having such a functional group include acrylic monomers such as methyl (meth)acrylate, ethyl (meth) acrylate, and propyl (meth)acrylate; acrylamides such as (meth)acrylamide, methyl(meth)acrylamide, and ethyl (meth)acrylamide; compounds having an unsaturated carbon atom such as (meth)acrylic acid, maleic anhydride, and maleimide; and monomers having aromatic rings such as benzene rings, pyridine rings, and thiophene rings, e.g., styrene, vinylpyridine, and vinylthiophene.

The functional monomer may be a monomer having two or more polymerizable groups (e.g., vinyl group) in a molecule.

The content of the functional monomer in the copolymer is preferably 0.01 to 50 mol %. Within this range, the organophilic clay can be finely dispersed in the copolymer. If the content is less than 0.01 mol %, the organophilic clay may not be finely dispersed. To the contrary, if the content is more than 50 mol %, the organophilic clay may not be finely dispersed.

The amount of the functional monomer in the copolymer is more preferably 0.05 to 50 mol %, most preferably 0.05 to 40 mol %, and particularly preferably 0.05 to 30 mol %. Within these ranges, the organophilic clay can be more finely dispersed in the copolymer.

Examples of the monomer copolymerizable with the functional monomer include: hydrocarbon compounds having a double bond such as ethylene, propylene, butene, and pentene; hydrocarbon compounds having a triple bond such as acetylene and propyne; and hydrocarbon compounds having two or more conjugated unsaturated bonds such as butadiene and isoprene. A branched structure or a ring structure may be present in the hydrocarbon chain of these compounds.

Depending on the combination with the functional monomer, the monomers enumerated above may be acrylic monomers such as methyl (meth)acrylate, ethyl (meth) acrylate, and propyl (meth)acrylate; acrylamides such as (meth)acrylamide, methyl(meth)acrylamide, and ethyl (meth)acrylamide; and monomers having aromatic rings such as styrene and methylstyrene. The aromatic ring may have a substituent group as in the case of methylstyrene. Further, the monomer may have two or more polymerizable groups in a molecule.

When a combination of monomers is used, a monomer, which has a larger interaction with the clay layer, is defined as a functional monomer. For example, styrene, which has a larger interaction with the clay layer, is a functional monomer in the case of an ethylene-styrene copolymer. Vinyloxazoline, which has a larger interaction with the clay layer, is a functional monomer in the case of a styrene-vinyloxazoline copolymer.

The method for preparing the copolymer is not particularly limited, and a known method can be used.

For example, if a vinyl monomer is used, a desired copolymer can be obtained by a radical polymerization, an anionic polymerization, a cationic polymerization, or a coordination polymerization. Examples of the radical polymerization include a bulk polymerization, an emulsion polymerization, a suspension polymerization, and a high-pressure polymerization. In the case of the coordination polymerization, a copolymer of a functional monomer and a nonpolar monomer can be obtained by, for example, a method disclosed in WO96/23010.

The number average molecular weight of the copolymer is preferably 5,000 to 10,000,000. Within this range, the processability of the resulting resin composite is good and the mechanical properties are improved. If the molecular weight is less than 5,000, the mechanical properties of the resin composite may be poor. To the contrary, if the molecular weight is more than 10,000,000, a processability problem of the resin composite may arise.

The number average molecular weight of the copolymer is more preferably 10,000 to 1,000,000, and most preferably 100,000 to 1,000,000. Within these ranges, the processability and the mechanical properties of the resin composite can be further improved.

However, formability can be made compatible with mechanical properties by increasing the molecular weight through cross-linking by means of, for example, a cross-linking agent or irradiation with electron beams after forming or concurrently with forming.

An example of the methods for producing the resin composites is a method wherein a resin composite is prepared by blending a copolymer and an organophilic clay.

As an example of the blending, the copolymer and the organophilic clay are blended in a solvent such as an organic solvent or an oil, and the solvent is removed after the completion of the blending. This process improves the dispersibility of the organophilic clay.

Further, a copolymer is blended with and an organophilic clay at a temperature equal to or higher than the softening point or the melting point of the copolymer. It is preferable that a shearing force be applied during this blending operation. This process makes it possible to disperse the organophilic clay uniformly in the copolymer. It is particularly preferable to fuse and knead the copolymer and the organophilic clay by means of an extruder while applying a shearing force.

These methods make it possible to finely disperse the organophilic clay in a matrix comprising the copolymer. According to these methods, a resin composite having excellent mechanical properties, such as excellent mechanical strength and modulus of elasticity in particular, can be obtained.

The above-mentioned advantages are presumably brought about by the following mechanism. When admixed with an organophilic clay having a multilayered structure, the copolymer having a functional group enters between the layers of the organophilic clay. Since the functional group of the copolymer has a high affinity for the clay surface, the copolymer is stabilized and restricted between the layers of the organophilic clay. Because of this structure, an intercalation compound is obtained which comprises the organophilic clay having the copolymer intercalated between layers thereof. In addition, the shearing force applied at the time of melt-kneading disperses the organophilic clay at a molecular level. As a result, a resin composite, in which the organophilic clay is dispersed uniformly in the copolymer, is obtained.

Particularly in a copolymer, in which the distribution of the functional groups can be easily controlled, the functional group can be positioned in a specific site. Because of this, a sufficient interaction between the clay surface and the functional group can be obtained, and therefore the clay can be easily dispersed in the copolymer by the application of a weak shearing force.

The organophilic clay, its interlayer distance and its application of a resin composite used the polymer (b) are the same as those of a resin composite used the polymer (a).

In the present invention, the most preferable embodiment is as below.

(1) A resin composite comprising an organophilic clay and polymers, wherein the polymer is two or more polymers having incompatibility wherein at least one of the polymers comprises a functional group.

In this case, one of the polymer becomes a matrix and the other (incompatible) polymer forms a micelle in the matrix. An organophilic clay is dispersed at a molecular level in the polymer comprising a functional group having a higher affinity for the organophilic clay.

(2) A resin composite comprising an organophilic clay and polymers, wherein the polymers are two or more polymers having incompatibility wherein the polymers are formed of a combination of modified polypropylene and ethylene propylene rubber.

(3) A resin composite comprising an organophilic clay and polymers, wherein the polymers are two or more polymers having incompatibility wherein the polymers are formed of a combination of homopolypropylene and modified ethylene propylene rubber, or a combination of butyl rubber and modified ethylene propylene rubber.

EXAMPLES

Examples of the polymers which are formed of two or more polymers wherein at least one of the polymers comprises a functional group are described in Examples 1 to 6 and Comparative Example 1. Examples of the polymers which are constituted of copolymers having a functional group are described in Examples 7 to 11 and Comparative Examples 2 to 4.

Example 1

A resin composite according to Example 1 is described with reference to FIG. 2D.

A resin composite in Example 1 comprises two or more of polymers and an organophilic clay. One of the polymers is a polymer having a functional group and the other is a polymer not having a functional group and both polymers are incompatible with each other.

① Preparation of Organophilic Clay

Na-montmorillonite (trademark: "Kunipia F" manufactured by Kunimine Kogyo Co., Ltd.) was prepared as a layer-structured clay mineral. 80 g of Na-montmorillonite was dispersed in 5000 ml of water kept at 80° C. A solution which had been prepared by dissolving 28.5 g of stearylamine and 11 ml of concentrated hydrochloric acid in 2000 ml of water at 80° C. was added to this Na-montmorillonite dispersion liquid. The precipitate produced was collected by filtration and was washed 3 times with water kept at 80° C. Then, the precipitate was freeze-dried. In this way, the montmorillonite was made organophilic by stearylammonium, and organophilic montmorillonite as an organophilic clay was obtained. The obtained is hereinafter referred to as C18-Mt. The content of inorganic substance as ignition residue in the organophilic montmorillonite was 68% by weight. The interlayer distance in the C18-Mt according to X-ray diffractometry was 22 Å.

② Preparation of Polymers

A modified EPR (trademark: "Toughmer MP0610" manufactured by Mitsui Petrochemical Co., Ltd., which is hereinafter referred to as a modified EPR) was prepared as a polymer having a functional group. The content of maleic anhydride in the modified EPR was 0.04 mmol/g.

In the meantime, Homo PP (trademark: "MA2" manufactured by Mitsubishi Chemical Co., Ltd., which is referred to as Homo PP hereinafter) was prepared as a polymer not having a functional group.

③ Production of Resin composite

Then, 700 g of Homo PP, 300 g of the modified EPR and 15 g of C18-Mt were melt-kneaded by using a twin-screw extruder at 200° C. In this manner, the resin composite of Example 1 was obtained.

Next, the dispersion state of C18-Mt in the obtained resin composite was evaluated. The dispersion state of the clay (montmorillonite) was evaluated by examining a molded specimen formed of the resin composite of this example by visual inspection, an optical microscope and a transmission electron microscope.

Figure 2:
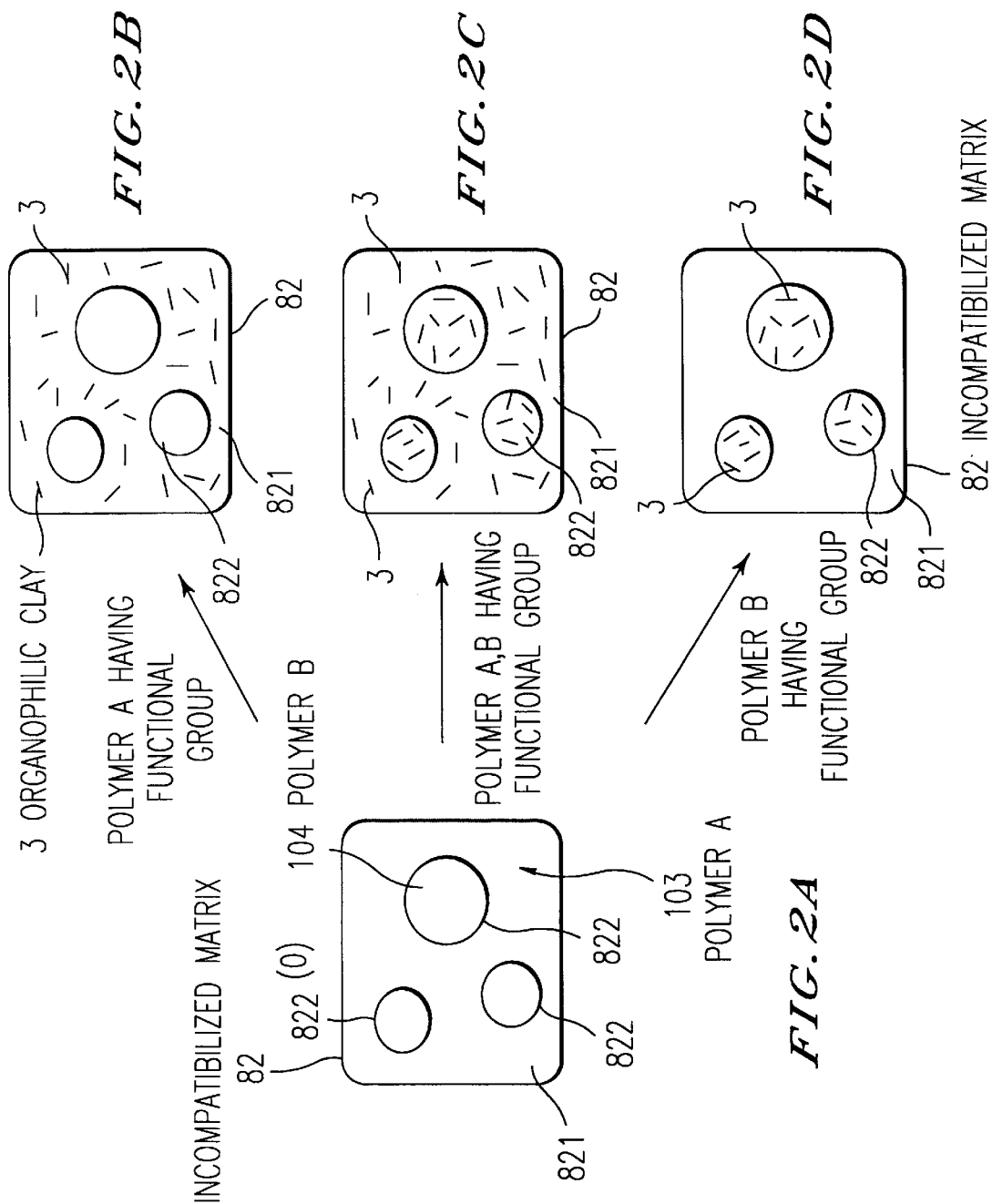
FIG. 2A is an explanatory view of incompatiblized polymers A and B according to this invention.
FIGS. 2B to 2D are explanatory views showing dispersing state of an organophilic clay in an incompatiblized matrix according to this invention.

As a result, one polymer of Homo PP formed a matrix 821 and another polymer of modified EPR formed a micelle 822 in the matrix 821 as shown in FIG. 2D. In this way, incompatibilized matrix 82, which comprises two or more incompatible polymers, is formed. The state thus formed can be likened to a sea and island structure comprising sea (matrix) and islands (micelles) floating therein. Since these Homo PP and modified EPR are incompatible with each other, the molecules of them gather respectively and this leads to the sea and island structure mentioned above.

Further, the organophilic clay 3 was dispersed in the micelle 822 in the incompatibilized matrix 82. This is presumed that since the polymer (modified EPR) comprises a functional group (maleic anhydride group) having a high affinity for the organophilic clay, this functional group interacts with the organophilic clay so that the organophilic clay (C18-Mt) is dispersed in the micelle formed of the polymer having the functional group.

Example 2

The resin composite according to Example 2 was prepared using butyl rubber (trademark: "Butyl 268" manufactured by Japan Synthetic Rubber Co., Ltd.) as a polymer not having a functional group.

600 g of the butyl rubber was melt-kneaded together with 400 g of the modified EPR and 15 g of C18-Mt used in Example 1 by means of a twin-screw extruder at 120° C. The content of maleic anhydride as the modified EPR in the polymer was 0.04 mmol/g. In this manner, the resin composite of this example was obtained.

Figure 7:
FIG. 7 is a microphotograph (magnifying power of 30,000) of composition of the resin composite showing a dispersing state of an organophilic clay in an incompatibilized matrix according to Example 2 of this invention.

The dispersion state of C18-Mt in the obtained resin composite was evaluated in the same manner as that of Example 1. A TEM (transmission electron microscope) photograph is shown in the FIG. 7. As shown in this photograph, the butyl rubber and the modified EPR form a sea and islands structure because of their incompatibility. C18-Mt was dispersed only in the modified EPR as the islands (micelle) in the order of nanometer (FIG. 2D). The modified EPR is recognized as black parts in the photograph.

Example 3

The resin composite of Example 3 was produced using maleic anhydride modified PP and EPR as two polymers which are incompatible with each other.

As the maleic anhydride modified PP, PO1015 (trademark) manufactured by Exon Co., Ltd. was used and this is hereinafter referred to as modified PP. The content of maleic anhydride in the modified PP was 0.02 mmol/g.

Further, as the EPR, V0131 manufactured by Sumitomo Chemical Co., Ltd. was used.

For producing the resin composite, 700 g of the modified PP and 300 g of the EPR were melt-kneaded together with 35 g of C18-Mt used in Example 1 by means of a twin-screw extruder at 200° C.

The dispersion state of C18-Mt in the obtained resin composite was evaluated in the same manner as that of Example 1. As a result, the resin composite formed an incompatibilized matrix 82 as shown in FIG. 2B. The modified PP formed a matrix 821 and the EPR formed a micelle 822. C18-Mt as the organophilic clay 3 was dispersed in the order of nanometer only in the modified PP forming the matrix 821.

Example 4

The resin composite of Example 4 was produced using modified PP and modified EPR as two polymers which are incompatible with each other.

As the modified PP, the modified PP (trademark: "PO1015" manufactured by Exon Co., Ltd.) used in Example 3 was employed. As the modified EPR, the modified EPR (trademark: "Toughmer MP0610 manufactured by Mitsui Petrochemical Co., Ltd.) used in Example 1 was employed. The content of maleic anhydride in the modified PP was 0.02 mmol/g while that in the modified EPR was 0.04 mmol/g.

For producing the resin composite, 700 g of the modified PP and 300 g of the modified EPR were melt-kneaded together with 35 g of C18-Mt used in Example 1 by means of a twin-screw extruder at 200° C.

The dispersion state of C18-Mt in the obtained resin composite was evaluated in the same manner as that of Example 1. As a result, the two kinds of polymers constituted of the modified PP and the modified EPR formed an incompatibilized matrix 82 as shown in FIG. 2C. The modified PP formed a matrix 821 and the EPR formed amicelle 822. C18-Mt as the organophilic clay 3 was dispersed in both of the modified PP phase as the matrix 821 and the modified EPR phase as the micelle 822 in the order of nanometer.

Example 5

The resin composite of Example 5 was prepared using polystyrene and a copolymer of styrene as a compatible polymer.

As polystyrene which is a polymer not having a functional group, trademark "Toupolene" manufactured by Mitsui Toatsu Co., Ltd. was employed. As styrene copolymer, styrene-vinyloxazoline copolymer (trademark: "Epocross RPS-1005" manuractured by Nippon Shokubai Kagaku Kogyo Co., Ltd.) was employed. The content of oxazoline (a functional group) in the styrene copolymer is 5 weight %.

Further, as an organophilic clay, montmorillonite made organophilic by using trimethyl-stearylamine as an organic agent was employed. The producing method of the resin composite is as follows.

Na-montmorillonite (trademark: "Kunipia F" manufactured by Kunimine Kogyo Co., Ltd.) was prepared as a layer-structured clay mineral. 80 g of Na-montmorillonite was dispersed in 5000 ml of water kept at 80° C. 36.8 g of trimethyl stearylammonium chloride was dissolved in 2000 ml of water at 80° C. and the resulting solution was added to the Na-montmorillonite dispersion liquid. The precipitate produced was collected by filtration and was washed 3 times with water kept at 80° C. Then, the precipitate was freeze-dried. In this way, the montmorillonite was made organophilic by trimethyl stearylammonium, and organophilic montmorillonite as an organophilic clay was obtained. The obtained is hereinafter referred to as C18TM-Mt. The content of inorganic substance as ignition residue in the organophilic montmorillonite was 66% by weight. The interlayer distance in the C18TM-Mt according to X-ray diffractometry was 22 Å.

For producing the resin composite of this example, 600 g of the polystyrene and 400 g of the styrene copolymer were melt-kneaded together with the C18TM-Mt by means of a twin-screw extruder at 150° C.

The dispersion state of C18TM-Mt in the obtained resin composite was evaluated in the same manner as that of Example 1. As a result, the two kinds of polymers 100 and 101 formed of the polystyrene and the styrene copolymer were compatible with each other and formed a compatibilized matrix 81 as shown in FIG. 1. C18TM-Mt as the organophilic clay 3 was dispersed in the compatibilized matrix 81 in the order of nanometer.

Example 6

The resin composite of Example 6 was prepared using PPO and styrene copolymer as compatible polymers.

PPO534 manufactured by GE Co., Ltd. was used as PPO. As the styrene copolymer, styrene-vinyloxazoline copolymer having a functional group (trademark: "Epocross RPS-1005 having oxazoline (a functional group) content of 5 weight %, manufactured by Nippon Shokubai Kagaku Kogyo Co., Ltd.) was employed.

For producing the resin composite of this example, 850 g of the PPO and 150 g of the styrene copolymer were melt-kneaded together with 35 g of C18TM-Mt used in Example 5 by means of a twin-screw extruder at 250° C.

The dispersion state of C18TM-Mt in the obtained resin composite was evaluated in the same manner as that of Example 1. As a result, the PPO and styrene copolymer were compatible with each other and formed a compatibilized matrix 81 as shown in FIG. 1. C18TM-Mt as the organophilic clay 3 was dispersed in the order of nanometer in the compatibilized matrix 81.

Comparative Example 1

The resin composite of Comparative Example 1 was produced using two polymers neither having functional groups.

The two polymers were Homo PP (trademark: MA2 manufactured by Mitsubishi Chemical Co., Ltd.) and EPR (trademark: V0131 manufactured by Sumitomo Chemical Co., Ltd.).

For producing the resin composite of this example, 700 g of the Homo PP and 300 g of the EPR were melt-kneaded together with 35 g of C18-Mt used in Example 1 by means of a twin-screw extruder at 200° C.

The dispersion state of C18-Mt in the obtained resin composite was evaluated in the same manner as that of Example 1. As a result, the Homo PP and EPR formed an incompatibilized matrix. C18-Mt was not finely dispersed in the incompatibilized matrix. Further, neither Homo PP nor EPR was intercalated between layers of C18-Mt.

Example 7

The resin composite according to an embodiment of the present invention is explained with reference to FIGS. 3, 4A to 4C, 6 and 8.

Figure 3:
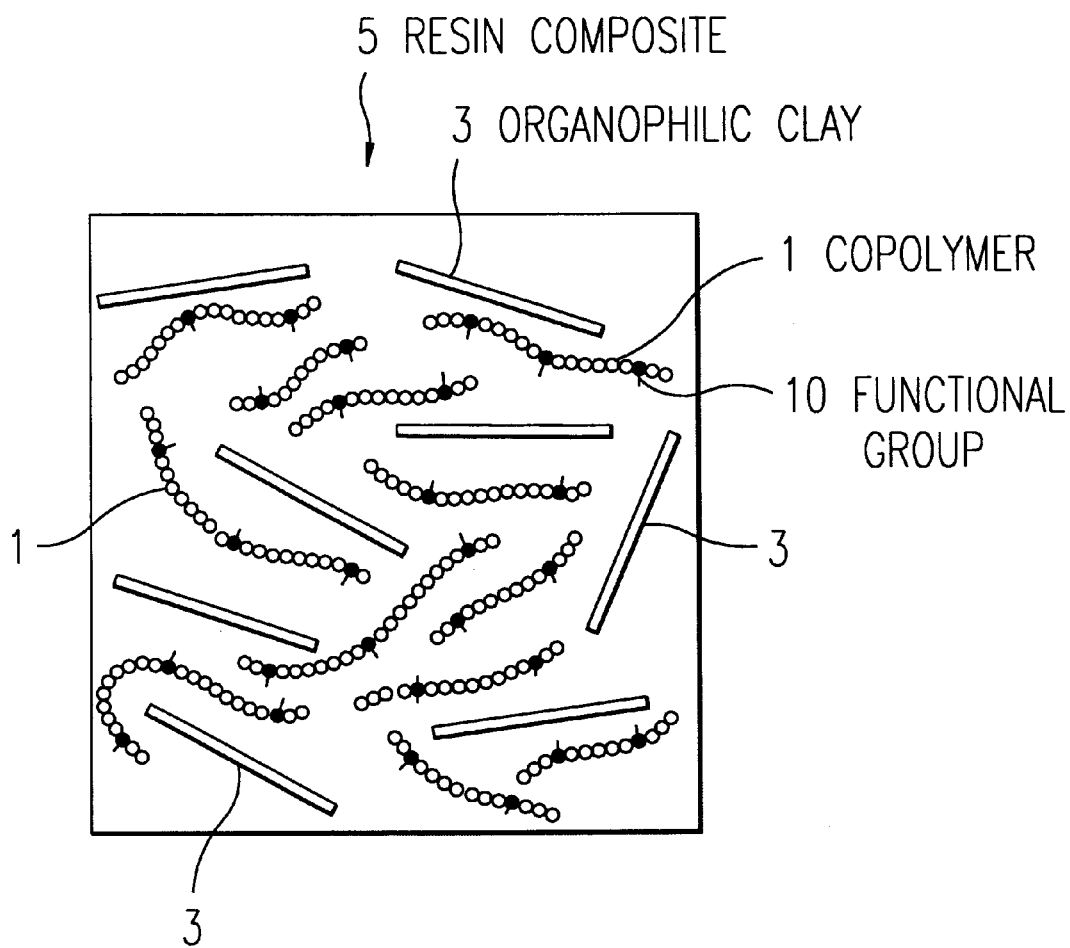
FIG. 3 is an explanatory view showing a resin composite comprising a polymer formed of a copolymer having a functional group in which an organophilic clay is dispersed according to this invention.

As shown in FIG. 3, the resin composite 5 of this example comprises an organophilic clay 3 dispersed in a copolymer 1 having a functional group 10.

As shown in FIGS. 4A to 4C, a copolymer is of a functional monomer 11 having a functional group 10 and of a monomer 12 copolymerizable with the functional monomer 11. The functional monomer 11 and the monomer 12 are distributed regularly or irregularly in the copolymer. As shown in FIG. 6, the organophilic clay 3 is a clay in which organic onium ions 6 are linked through ionic bonds to the layers of clay 7 having a hydrophilic surface.

Figure 8:
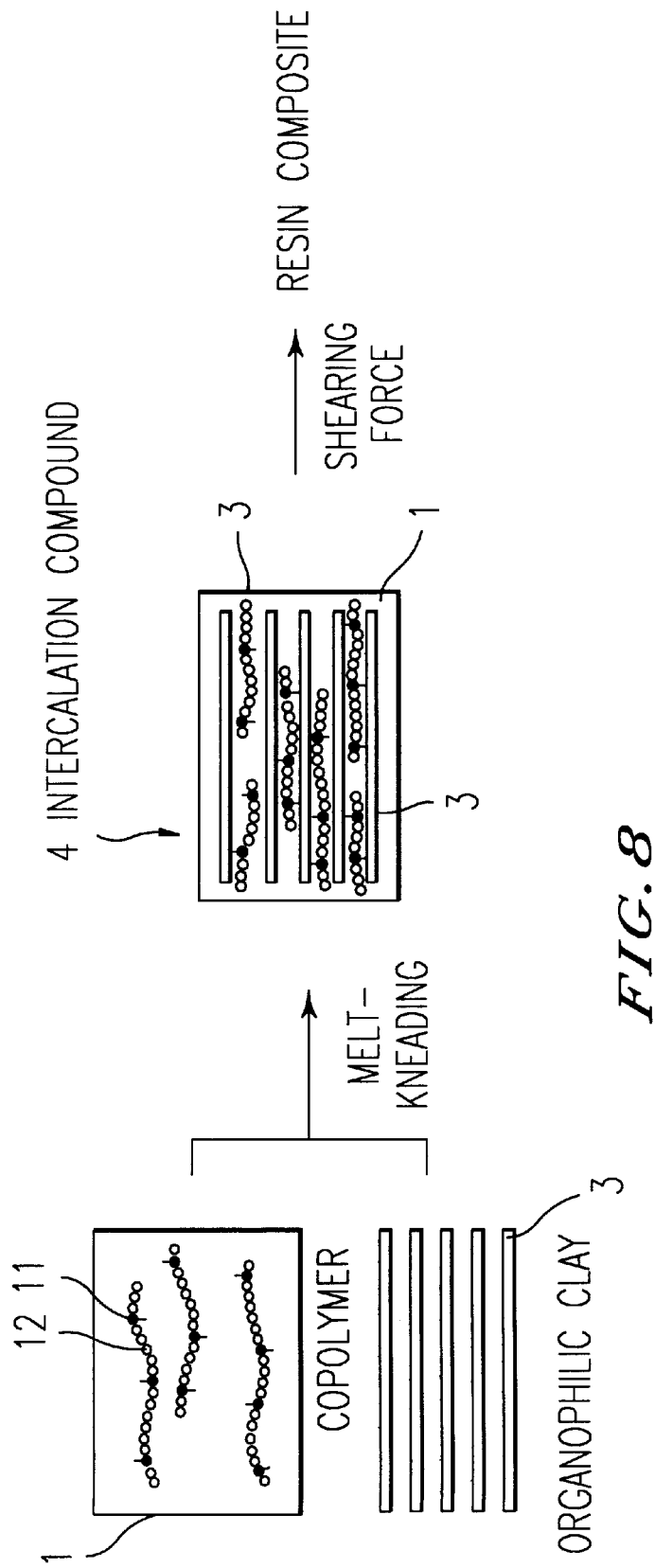
FIG. 8 is an explanatory view of a method for producing a resin composite according to Example 7 of this invention.
Figure 9:
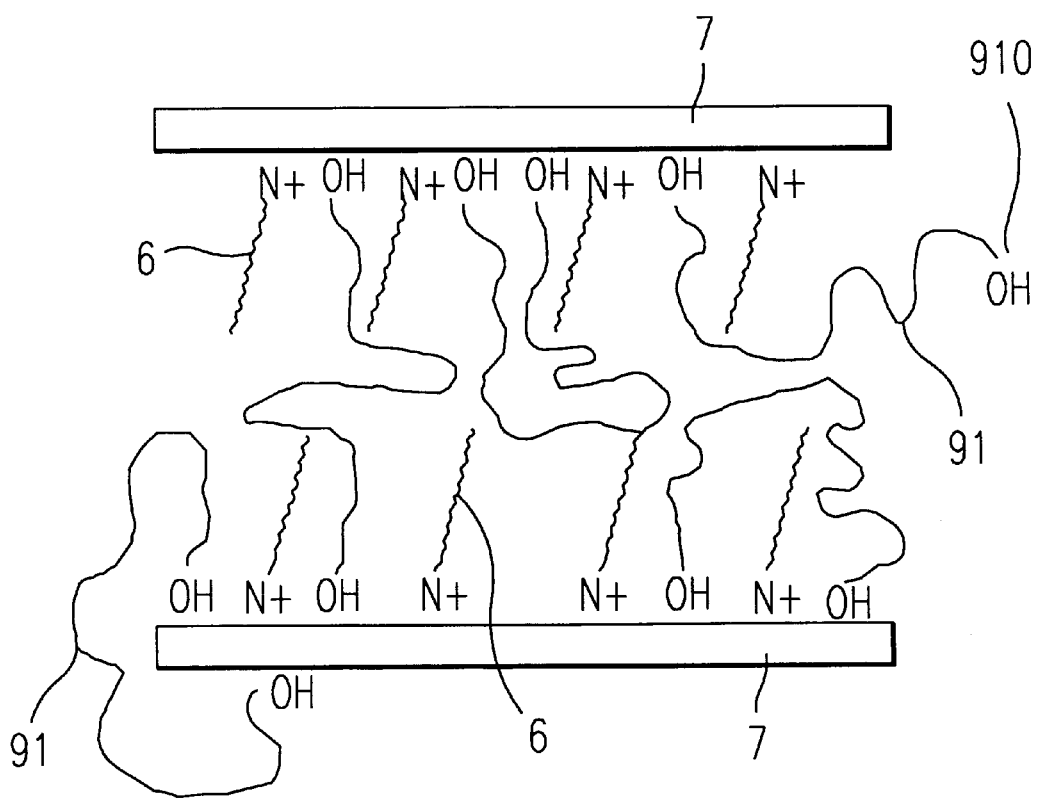
FIG. 9 is an explanatory view of a resin composite according to a conventional art.

As shown in FIG. 8, a resin composite was obtained by a process wherein the copolymer 1 having the functional group and the organophilic clay 3 are melt-kneaded under the application of a shearing force so that the copolymer 1 and the organophilic clay 3 are made composite.

① Preparation of organophilic Clay

Na-montmorillonite (trademark: "Kunipia F" manufactured by Kunimine Kogyo Co., Ltd.) was prepared as a layer-structured clay mineral. 80 g of Na-montmorillonite was dispersed in 5000 ml of water kept at 80° C. A solution which had been prepared by dissolving 28.5 g of stearylamine and 11 ml of concentrated hydrochloric acid in 2000 ml of water at 80° C. was added to this Na-montmorillonite dispersion liquid. The precipitate produced was collected by filtration and was washed 3 times with water kept at 80° C. Then, the precipitate was freeze-dried. In this way, the montmorillonite was made organophilic by stearylammonium, and organophilic montmorillonite as an organophilic clay was obtained. The obtained is hereinafter referred to as C18-Mt. The content of inorganic substance as ignition residue in the organophilic montmorillonite was 68% by weight. The interlayer distance in the C18-Mt according to X-ray diffractometry was 22 Å.

② Preparation of a Resin Composite

An ethylene-methyl methacrylate copolymer, "Acryft 306-1" manufactured by Sumitomo Chemical Co., Ltd., was used as a copolymer. This copolymer is hereinafter referred to as Acryft. The content of methyl methacrylate in the Acryft was 2 mol %.

Next, 1500 g of Acrift and 120 g of C18-Mt were melt-kneaded by using a twin-screw extruder at 150° C. In this way, the resin composite of this example was obtained.

The content of inorganic substance as ignition residue in the resin composite was 5.0% by weight.

(Dispersion State of Clay)

The resin composite of Example 7 was injection-molded into an article. A test piece for observation was cut out of the article. The state of dispersion of clay in this test piece was examined by visual inspection, an optical microscope, and a transmission electron microscope.

It was found that the organophilic clay was dispersed in the order of nanometer.

(Tensile Test)

The resin composite of this example was injection-molded to obtain a test piece. The test piece thus obtained was subjected to a tensile test at 25° C. and a tensile modulus was measured. The head speed at the time of the measurement was set 10 mm/minute.

According to the results of the measurement, the tensile modulus of the resin composite of this example was 1.7 times that of Acryft.

(Dynamic Viscoelasticity)

The resin composite of this example was injection-molded to obtain a test piece. Then, the test piece thus prepared was subjected to the measurement of dynamic viscoelasticity to obtain storage modulus(dynamic modulus of elasticity). The frequency used for the measurement was 10 Hz, and the temperature for the measurement was 30° C.

According to the results of the measurement, the storage modulus of the resin composite of this example was 1.9 times that of Acryft.

(Gas-barrier Properties)

The resin composite of this example was formed into a 0.5 mm thick sheet by means of a heat press. This sheet was subjected to the measurement of gas transmission by using nitrogen gas to obtain a gas transmission coefficient.

According to the results of the measurement, the gas transmission coefficient of the resin composite of this example was 0.54 times that of Acryft, thereby indicating the improvement of gas-barrier properties.

Example 8

The resin composite of Example 8 uses an ethylene-methacrylic acid copolymer as the copolymer.

For the preparation of the resin composite of this example, an ethylene-methacrylic acid copolymer ("Nuclele N0200H" manufactured by Du Pont-Mitsui Chemical Co., Ltd.), was used. This copolymer is hereinafter referred to as Nuclele. The content of methacrylic acid in Nuclele was 0.8 mol %.

Next, 1500 g of Nuclele and 120 g of C18-Mt were melt-kneaded by using a twin-screw extruder at 150° C. In this way, the resin composite of this example was obtained.

The content of inorganic substance as ignition residue in the resin composite was 5.0% by weight.

The physical properties of the resin composite were evaluated in the same ways as in Example 7.

(Dispersion State of Clay)

It was found that the organophilic clay was dispersed in the resin composite of this example in the order of nanometer.

(Tensile Test)

The tensile modulus of the resin composite of this example was 1.7 times that of Nuclele.

(Dynamic viscoelasticity)

The storage modulus of the resin composite of this example was 2.0 times that of Nuclele.

(Gas-barrier Properties)

The gas transmission coefficient of the resin composite of this example was 0.52 times that of Nuclele, thereby indicating the improvement of gas-barrier properties.

Example 9

The resin composite of Example 9 used a styrene-vinyloxazoline copolymer as the copolymer and montmorillonite modified with an organic substance by trimethylstearylamine as the organophilic clay.

First, for the producing the resin composite of this example, montmorillonite was modified with trimethylstearylamine by the same way as in the preparation of the aforementioned C18-Mt. The organophilic-montmorillonite thus obtained is hereinafter referred to as C18TM-Mt.

The content of inorganic substance as ignition residue in C18TM-Mt was 66% by weight. The interlayer distance determined by X-ray diffractometry of C18TM-Mt was 22 Å.

Next, for producing the resin composite of this example, a styrene-vinyloxazoline copolymer ("Epocross RPS" manufactured by Nippon Shokubai Kagaku Kogyo Co., Ltd.), was selected as the copolymer. This copolymer is hereinafter referred to as Epocross. The content of oxazoline in Epocross was 5 mol %.

1500 g of Epocross and 120 g of C18TM-Mt were melt-kneaded by using a twin-screw extruder at 150° C. In this way, the resin composite of this example was obtained.

The content of inorganic substance as ignition residue in the resin composite was 5.0% by weight.

The physical properties of the resin composite were evaluated in the same ways as in Example 7.

(Dispersion State of Clay)

It was found that the organophilic clay was dispersed in the resin composite of this example in the order of nanometer.

(Tensile Test)

The tensile modulus of the resin composite of this example was 1.5 times that of Epocross.

(Dynamic Viscoelasticity)

The storage modulus of the resin composite of this example was 1.55 times that of Epocross.

(Gas-barrier Properties)

The gas transmission coefficient of the resin composite of this example was 0.60 times that of Epocross, thereby indicating the improvement of gas-barrier properties.

Example 10

The resin composite of Example 10 used a styrene-methacrylic acid copolymer as the copolymer.

First, 100 g of styrene, 0.033 g of methacrylic acid, and 0.5 g of BPO (benzoyl peroxide) were dissolved in benzene (solvent), and the resulting solution was kept at 80° C. for 3 hours. Then, benzene as solvent was removed, and the styrene-methacrylic acid copolymer was obtained. This copolymer is hereinafter referred to as SMCPa. The content of methacrylic acid as a functional monomer in SMCPa was 0.05 mol %.

1500 g of SMCPa and 120 g of C18-Mt were melt-kneaded by using a twin-screw extruder at 150° C. In this way, the resin composite of this example was obtained.

The content of inorganic substance as ignition residue in the resin composite was 5.0% by weight.

The physical properties of the resin composite were evaluated in the same ways as in Example 7.

(Dispersion State of Clay)

It was found that the organophilic clay was dispersed in the resin composite of this example in the order of nanometer.

(Tensile Test)

The tensile modulus of the resin composite of this example was 1.6 times that of SMCPa.

(Dynamic Viscoelasticity)

The storage modulus of the resin composite of this example was 1.6 times that of SMCPa.

(Gas-barrier Properties)

The gas transmission coefficient of the resin composite of this example was 0.58 times that of SMCPa, thereby indicating the improvement of gas-barrier properties.

Example 11

The resin composite of Example 11 used a styrene-methacrylic acid copolymer containing 0.5 mol % of methacrylic acid as a functional monomer.

First, 100 g of styrene, 0.33 g of methacrylic acid, and 0.5 g of BPO (benzoyl peroxide) were dissolved in benzene (solvent), and the resulting solution was kept at 80° C. for 3 hours. Then, benzene as solvent was removed, and the styrene-methacrylic acid copolymer was obtained. This copolymer is hereinafter referred to as SMCPb. The content of methacrylic acid as a functional monomer in SMCPb was 0.5 mol %.

1500 g of SMCPb and 120 g of C18-Mt were melt-kneaded by using a twin-screw extruder at 150° C. In this way, the resin composite of this example was obtained.

The content of inorganic substance as ignition residue in the resin composite was 5.0% by weight.

The physical properties of the resin composite were evaluated in the same ways as in Example 7.
(Dispersion State of Clay)

It was found that the organophilic clay was dispersed in the resin composite of this example in the order of nanometer.
(Tensile Test)

The tensile modulus of the resin composite of this example was 1.6 times that of SMCPb.
(Dynamic Viscoelasticity)

The storage modulus of the resin composite of this example was 1.6 times that of SMCPb.
(Gas-barrier Properties)

The gas transmission coefficient of the resin composite of this example was 0.55 times that of SMCPb, thereby indicating the improvement of gas-barrier properties. Comparative Example 2

The resin composite of Comparative Example used polypropylene ("MA2" manufactured by Mitsubishi Chemical Co., Ltd., hereinafter referred to as MA) as a polymer.

1500 g of MA and 110 g of C18-Mt were melt-kneaded by using a twin-screw extruder at 200° C. In this way, the resin composite of this example was obtained.

The content of inorganic substance as ignition residue in the resin composite was 4.8% by weight.

The physical properties of the resin composite were evaluated in the same ways as in Example 7.
(Dispersion State of clay)

It was found that the organophilic clay (C18-Mt) was dispersed as particles having sizes in the range of from 1 mm to 10 μm in the resin composite of this example. Almost no change occurred in the interlayer distance of clay.
(Tensile Test)

The tensile modulus of the resin composite of this example was 1.06 times that of MA. Thus, the reinforcing effect on the composite was slight.
(Dynamic Viscoelasticity)

The storage modulus of the resin composite of this example was 1.2 times that of MA.
(Gas-barrier Properties)

The gas transmission coefficient of the resin composite of this example was 1.01 times that of MA, thereby indicating the degradation of gas-barrier properties.

The above results indicate that the polypropylene having no functional group is not intercalated between clay layers and therefore the clay is not finely dispersed, and that the reinforcing effect and the improved gas-barrier properties by an effect of clay are hardly recognized.

Comparative Example 3

The resin composite of Comparative Example 3 used an ethylene-propylene rubber ("Esprene VO131" manufactured by Sumitomo Chemical Co., Ltd., hereinafter referred to as Esprene) as a polymer.

1500 g of Esprene and 110 g of C18-Mt were melt-kneaded by using a twin-screw extruder at 150° C. In this way, the resin composite of this example was obtained.

The content of inorganic substance as ignition residue in the resin composite was 4.8% by weight.

The physical properties of the resin composite were evaluated in the same ways as in Example 7.
(Dispersion State of Clay)

It was found that the organophilic clay was dispersed as particles having sizes in the range of from 10 μm to 1 mm in the resin composite of this example. Almost no change occurred in the interlayer distance of clay.
(Tensile Test)

The tensile modulus of the resin composite of this example was 1.04 times that of Esprene. Thus, the reinforcing effect on the composite was slight.
(Dynamic Viscoelasticity)

The storage modulus of the resin composite of this example was 1.08 time s that of Esprene.
(Gas-barrier Properties)

The gas transmission coefficient of the resin composite of this example was 1.02 times that of Esprene, thereby indicating the degradation of gas-barrier properties.

The above results indicate that the polypropylene having no functional group is not intercalated between clay layers and therefore the clay is not finely dispersed, and that the reinforcing effect and the improved gas-barrier properties by an effect of clay are hardly recognized.

Comparative Example 4

The resin composite of Comparative Example 4 used poly(methyl methacrylate) ("Parapet G" manufactured by Kuraray Co., Ltd., hereinafter referred to as PMMA) as a polymer.

1500 g of PMMA and 110 g of C18-Mt were melt-kneaded by using a twin-screw extruder at 220° C. In this way, the resin composite of this example was obtained.

The content of inorganic substance as ignition residue in the resin composite was 5.0% by weight.

The physical properties of the resin composite were evaluated by the same ways as in Example 7.
(Dispersion State Clay)

It was found that the organophilic clay (C18-Mt) was dispersed as particles having sizes in the range of from 1 μm to 10 μm in the resin composite of this example.
(Tensile Test)

The tensile modulus of the resin composite of this example was 1.03 times that of PMMA.
(Dynamic Viscoelasticity)

The storage modulus of the resin composite of this example was 1.07 times that of PMMA.
(Gas-barrier Properties)

The gas transmission coefficient of the resin composite of this example was 1.05 times that of PMMA, thereby indicating the degradation of gas-barrier properties.

What is claimed is:

1. A resin composite comprising,
   an organophilic clay and a polymer,
   wherein said polymer comprises:
   component (a) two or more polymers, at least one of which is poly(phenylene oxide), or
   component (b) a copolymer comprising at least one oxazoline functional group.

2. A resin composite according to claim 1, wherein said two or more polymers are compatible with each other.

3. A resin composite according to claim 2, wherein said two or more polymers are identical or similar in the structure of a main chain.

4. A resin composite according to claim 2, wherein said two or more polymers have the same structural part in common.

5. A resin composite according to claim 1, wherein said two or more polymers are incompatible with each other.

6. A resin composite according to claim 5, wherein a matrix polymer among said two or more polymers has a functional group.

7. A resin composite according to claim 5, wherein both of a matrix polymer and a micelle polymer among the two or more polymers have a functional group.

8. A resin composite according to claim 5, wherein a micelle polymer among said two or more polymers has a functional group.

9. A resin composite according to claim 1, wherein the copolymer is a random copolymer in which functional monomers are randomly distributed in the copolymer, an alternating copolymer in which a functional monomer and a copolymerizable monomer are alternately linked to each other, or a copolymer in which sequences of a plurality of functional monomers are distributed.

10. A resin composite according to claim 9, wherein a polymer which is subjected to the modification is at least one selected from the group consisting of polyethylene, polypropylene, polybutene, polypentene, ethylene-propylene copolymers, ethylene-butene copolymers, polybutadiene, polyisoprene, hydrogenated polybutadiene, hydrogenated polyisoprene, ethylene-propylene-diene copolymers, ethylene-butene-diene copolymers, butyl rubber, polystyrene, styrene-butadiene copolymers, styrene-hydrogenated butadiene copolymers, polyamide, polycarbonate, polyacetal, polyester, poly(phenylene ether), poly(phenylene sulfide), polyethersulfone, polyetherketone, polyarylate, polymethylpentene, polyphthalamide, polyethernitrile, polybenzimidazole, polycarbodiimide, polytetrafluoroethylene, fluororesins, polyamideimide, polyetherimide, liquid crystal polymers, epoxy resins, melamine resins, urea resins, diallyl phthalate resins, phenolic resins, polysilanes, polysiloxanes, silicone resins, and urethane resins.

11. A resin composite according to claim 1, wherein the number average molecular weight of the polymer is 5,000 to 10,000,000.

12. A resin composite according to claim 1, wherein the polymer comprises a copolymer having a functional group.

13. A resin composite according to claim 7, wherein the functional monomers are at least one selected from the group consisting of acrylic monomers, acrylamides, compounds having an unsaturated carbon atom, and monomers having aromatic rings, the acrylic monomers being methyl (meth)acrylate, ethyl (meth)acrylate, or propyl (meth)acrylate; the acrylamides being (meth)acrylamide, methyl (meth)acrylamide, or ethyl(meth)acrylamide; the compounds having an unsaturated carbon atom being (meth) acrylic acid, maleic anhydride, or maleimide; and the monomers having aromatic rings of benzene rings, pyridine rings, or thiophene rings being styrene, vinylpyridine, and vinylthiophene.

14. A resin composite according to claim 13, wherein the content of the functional monomer in the copolymer is 0.01 to 50 mol %.

15. A resin composite according to claim 1, wherein the organophilic clay is formed by ionically bonding between organic onium ions and the surface of clay.

16. A resin composite according to claim 15, wherein the organic onium ion comprises 6 or more carbon atoms.

17. A resin composite according to claim 15, wherein the organic onium ion is at least one selected from the group consisting of hexylammonium ions, octylammonium ions, 2-ethylhexylammonium ions, dodecylammonium ions, laurylammonium ions, octadecylammonium ions (stearylammonium) ions, dioctyldimethylammonium ions, trioctylammonium ions, distearyldimethylammonium ions, stearyltrimethylammonium ions, and laurate ammonium ions.

18. A resin composite according to claim 15, wherein the cation exchanging capacity of the clay is 50 to 200 milliequivalents/100 g.

19. A resin composite according to claim 15, wherein the clay is at least one selected from the group consisting of montmorillonite, saponite, hectorite, beidellite, stibensite, and nontronite, vermiculite, halloysite, and mica.

20. A resin composite according to claim 15, wherein the content to be used of the organic onium ion is 0.3 to 3 equivalents of the ion exchanging capacity of the clay.

21. A resin composite according to claim 1, wherein the content to be added of the organophilic clay is 0.01 to 200 parts by weight based on 100 parts by weight of the two or more polymers.

22. A resin composite according to claim 1, wherein the organophilic clay is dispersed in particles of 1 $\mu$m or less.

23. A resin composite according to claim 1, wherein the organophilic clay has a layered structure with an interlayer distance expanded by 10 Å or more than the initial distance.

24. A resin composite according to claim 1, wherein the organophilic clay is dispersed as a monolayer.

25. A resin composite according to claim 1, wherein said polymer component (a) comprises polystyrene and poly (phenylene oxide) and the copolymer component (b) is a styrene copolymer comprising oxazoline functional groups.

* * * * *

UNITED STATES PATENT AND TRADEMARK OFFICE
CERTIFICATE OF CORRECTION

| | | |
|---|---|---|
| PATENT NO. | : 6,117,932 C1 | Page 1 of 1 |
| APPLICATION NO. | : 90/009057 | |
| DATED | : September 14, 2010 | |
| INVENTOR(S) | : Frank A. Galdes and Mark A. Ericson | |

It is certified that error appears in the above-identified patent and that said Letters Patent is hereby corrected as shown below:

Replace the claim 27 language in column 3, line 18 "The method of claim 23" with the language --The method of claim 26--

Replace the claim 51 language in column 35, line 17 "The method of claim 49" with the language --The method of claim 50--

Signed and Sealed this
Fourteenth Day of June, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 6,117,932 | Page 1 of 1 |
| APPLICATION NO. | : 09/154723 | |
| DATED | : September 12, 2000 | |
| INVENTOR(S) | : Naoki Hasegawa et al. | |

It is certified that error appears in the above-identified patent and that said Letters Patent is hereby corrected as shown below:

This certificate supersedes the Certificate of Correction issued June 14, 2011. The certificate is vacated since no Certificate of Correction was requested with this patent number.

Signed and Sealed this
Twenty-third Day of August, 2011

David J. Kappos
*Director of the United States Patent and Trademark Office*